US008955084B2

(12) United States Patent
Do et al.

(10) Patent No.: US 8,955,084 B2
(45) Date of Patent: Feb. 10, 2015

(54) TIMESTAMP-BASED TOKEN REVOCATION (75) Inventors: Tu Dien Do, Waterloo (CA); Scott Peter Gammon, Waterloo (CA); John Andrew McGregor, Ottawa (CA)

(73) Assignee: BlackBerry Limited, Waterloo (CA)

( * ) Notice: Subject to any disclaimer, the term of this patent is extended or adjusted under 35 U.S.C. 154(b) by 91 days.

(21) Appl. No.: 13/293,634

(22) Filed: Nov. 10, 2011

(65) Prior Publication Data

US 2013/0125228 A1 May 16, 2013

(51) Int. Cl.
*H04L 29/06* (2006.01)
*G06F 21/33* (2013.01)
*H04L 9/32* (2006.01)
*H04L 29/08* (2006.01)

(52) U.S. Cl.
CPC .............. *G06F 21/33* (2013.01); *H04L 9/3213* (2013.01); *H04L 9/3294* (2013.01); *H04L 63/0823* (2013.01); *H04L 63/0807* (2013.01); *G06F 2221/2137* (2013.01); *G06F 2221/2151* (2013.01); *H04L 67/06* (2013.01)
USPC ....................... 726/9; 726/6; 726/10; 713/158

(58) Field of Classification Search
CPC . H04L 9/3213; H04L 9/3294; H04L 63/0807; H04L 63/0823
USPC ...................................... 726/6, 9, 10; 713/158
See application file for complete search history.

(56) References Cited

U.S. PATENT DOCUMENTS

| 6,792,424 | B1 * | 9/2004 | Burns et al. ............................. 1/1 |
| 7,062,654 | B2 * | 6/2006 | Millen et al. ................... 713/182 |
| 7,430,587 | B2 * | 9/2008 | Malone et al. ................. 709/217 |
| 7,743,248 | B2 * | 6/2010 | Bisbee et al. .................. 713/158 |
| 7,877,480 | B2 * | 1/2011 | Wardrop ....................... 709/225 |
| 8,001,371 | B2 * | 8/2011 | Langer .......................... 713/156 |
| 8,019,757 | B2 * | 9/2011 | Malone et al. ................. 707/733 |
| 8,151,116 | B2 * | 4/2012 | van der Horst et al. ........ 713/185 |
| 8,209,427 | B2 * | 6/2012 | Brown et al. .................. 709/229 |
| 8,307,414 | B2 * | 11/2012 | Zerfos et al. ..................... 726/10 |
| 8,359,643 | B2 * | 1/2013 | Low et al. .......................... 726/9 |
| 8,364,674 | B2 * | 1/2013 | Malone et al. ................. 707/733 |

(Continued)

FOREIGN PATENT DOCUMENTS

EP 2081190 A2 7/2009

OTHER PUBLICATIONS

Hemam, Sofiane Mounine; Hidouci, Khaled Walid; "A Fully Decentralized Algorithm to Timestamping Transactions in a Peer-To-Peer Environments", International Conference on Machine and Web Intelligence, Oct. 3-5, 2010, pp. 185-189.*

(Continued)

*Primary Examiner* — Victor Lesniewski
(74) *Attorney, Agent, or Firm* — Ridout & Maybee LLP (57) ABSTRACT A token used when a first device authenticates itself to a third device may be associated with a token issue timestamp. Upon receipt of an indication that all previously issued tokens are to be revoked, a second device may store a revocation timestamp. Upon receiving, from the second device, a request for establishing conditions for a file transfer, from the first device, and an indication of a token issue timestamp associated with the request, the second device may compare the token issue timestamp to the revocation timestamp. Responsive to determining, based on the comparing, that the token issue timestamp precedes the revocation timestamp, the second device may deny the request.

16 Claims, 7 Drawing Sheets

(56) References Cited

U.S. PATENT DOCUMENTS

| | | | |
|---|---|---|---|
| 8,407,776 B2* | 3/2013 | Somani et al. | 726/9 |
| 8,452,958 B2* | 5/2013 | Sun et al. | 713/158 |
| 8,621,598 B2* | 12/2013 | Lai et al. | 726/14 |
| 8,635,442 B2* | 1/2014 | Agrawal | 713/155 |
| 8,707,031 B2* | 4/2014 | Grajek et al. | 713/158 |
| 2007/0150944 A1* | 6/2007 | Zeng et al. | 726/6 |
| 2008/0270790 A1* | 10/2008 | Brickell et al. | 713/158 |
| 2008/0307223 A1* | 12/2008 | Brickell et al. | 713/158 |
| 2009/0044260 A1* | 2/2009 | Niglio et al. | 726/9 |
| 2009/0113543 A1* | 4/2009 | Adams et al. | 726/18 |
| 2009/0144540 A1* | 6/2009 | Davis et al. | 713/156 |
| 2010/0049968 A1* | 2/2010 | Dimitrakos et al. | 713/153 |
| 2010/0257358 A1* | 10/2010 | Grajek et al. | 713/158 |
| 2010/0268944 A1* | 10/2010 | Ueda et al. | 713/157 |
| 2012/0311686 A1* | 12/2012 | Medina et al. | 726/7 |
| 2013/0036303 A1* | 2/2013 | Himawan et al. | 713/158 |
| 2013/0047215 A1* | 2/2013 | Radhakrishnan et al. | 726/4 |
| 2013/0132718 A1* | 5/2013 | Agrawal | 713/158 |

OTHER PUBLICATIONS

"Code Signing FAQ"; How Thawte Code Signing Works; www.thawte.com/resources/ssl-information-center/ssl-beyond-ecommerce/code-signing-faq/; 3 Pages, Oct. 31, 2011.

"Authentication and Authorization for Google APIs"; AuthSub for Web Application; http://code.google.com/apis/accounts/docs/AuthSub.html; 16 Pages, Oct. 31, 2011.

"Electronic Signatures and Infrastructures (ESI); XML Advanced Electronic Sugnatures (XAdES)", Technical Specification, European Telecommunications Standards Institure (ETSI), 650, Route Des Lucioles; F-06921 Sophia-Antipolis; France, vol. ESI, No. V1.4.1, Dec. 1, 2010, XP014061831.

Gondrom S Fischer-Dieskau T: "Validation and long term verification data for Evidence Records and signed documents; draft-ietf-ltans-validate-03.txt", Internet Engineering Task Force, IETF; Standardworkingdraft, Internet Society (ISOC) 4, Rue Des Falaises CH-1205 Geneva, Switzerl, No. 3, Jul. 13, 2010, pp. 1-10, XP015070146.

"Signature Policies Report", ETSI Draft; ESI15-20 STF 178 Task 4 TR, European Telecommunications Standards Institute (ETSI), 650, Route Des Lucioles; F-06921 Sophia-Antipolis; France, No. V0.0.5, Jan. 21, 2002, pp. 1-30, XP014058019, [retrieved on Jan. 21, 2002].

Pinkas Bull N Pope J Ross Security & Standards D: "Policy Requirements for Time-Stamping Authorities (TSAs); rfc3628.txt", Nov. 1, 2003, XP015009410, ISSN: 0000-0003.

Extended European Search Report dated Jan. 25, 2012, for application No. 11188700.6.

* cited by examiner

FIG. 7

TIMESTAMP-BASED TOKEN REVOCATION

FIELD

The present application relates generally to authentication of rights using tokens and, more specifically, to timestamp-based token revocation.

BACKGROUND

As more and more devices become network connected, there remain few ways to manage interaction between devices, such as a transfer of a file from one device to another, in a simple and secure manner.

BRIEF DESCRIPTION OF THE DRAWINGS

Reference will now be made, by way of example, to the accompanying drawings which show example implementations; and in which.

DETAILED DESCRIPTION

To assist in securing a first device and a second device, tokens may be employed. That is, the first device, when attempting to interact with the second device, may contact, and authenticate itself to, a third device by providing an earlier-obtained token.

The first device may be allowed to store the earlier-obtained token for future use in requesting permission to interact with the second device. However, in the event that the first device is lost or stolen, the user of the second device may no longer consider receipt of requests from the first device to be related to secure transactions.

The token used when the first device authenticates itself to the third device may be associated with a token issue timestamp. Upon receipt of an indication that all previously issued tokens are to be revoked, the second device may store a revocation timestamp. Upon receiving a request for establishing conditions for interaction and an indication of a token issue timestamp with the request, the second device may compare the token issue timestamp to the revocation timestamp. Responsive to determining, based on the comparing, that the token issue timestamp precedes the revocation timestamp, the second device may deny the request.

According to an aspect of the present disclosure, there is provided, at a target device, a method of handling a request to interact with the target device. The method includes receiving the request and, in conjunction with the receiving, receiving a token issue timestamp and comparing the token issue timestamp to a revocation timestamp. The method further includes, in response to determining that the token issue timestamp precedes a revocation timestamp, denying the request. In other aspects of the present application, a processor is provided for carrying out this method and a computer readable medium is provided for adapting a processor to carry out this method.

Other aspects and features of the present disclosure will become apparent to those of ordinary skill in the art upon review of the following description of specific implementations of the disclosure in conjunction with the accompanying figures.

Figure 1:
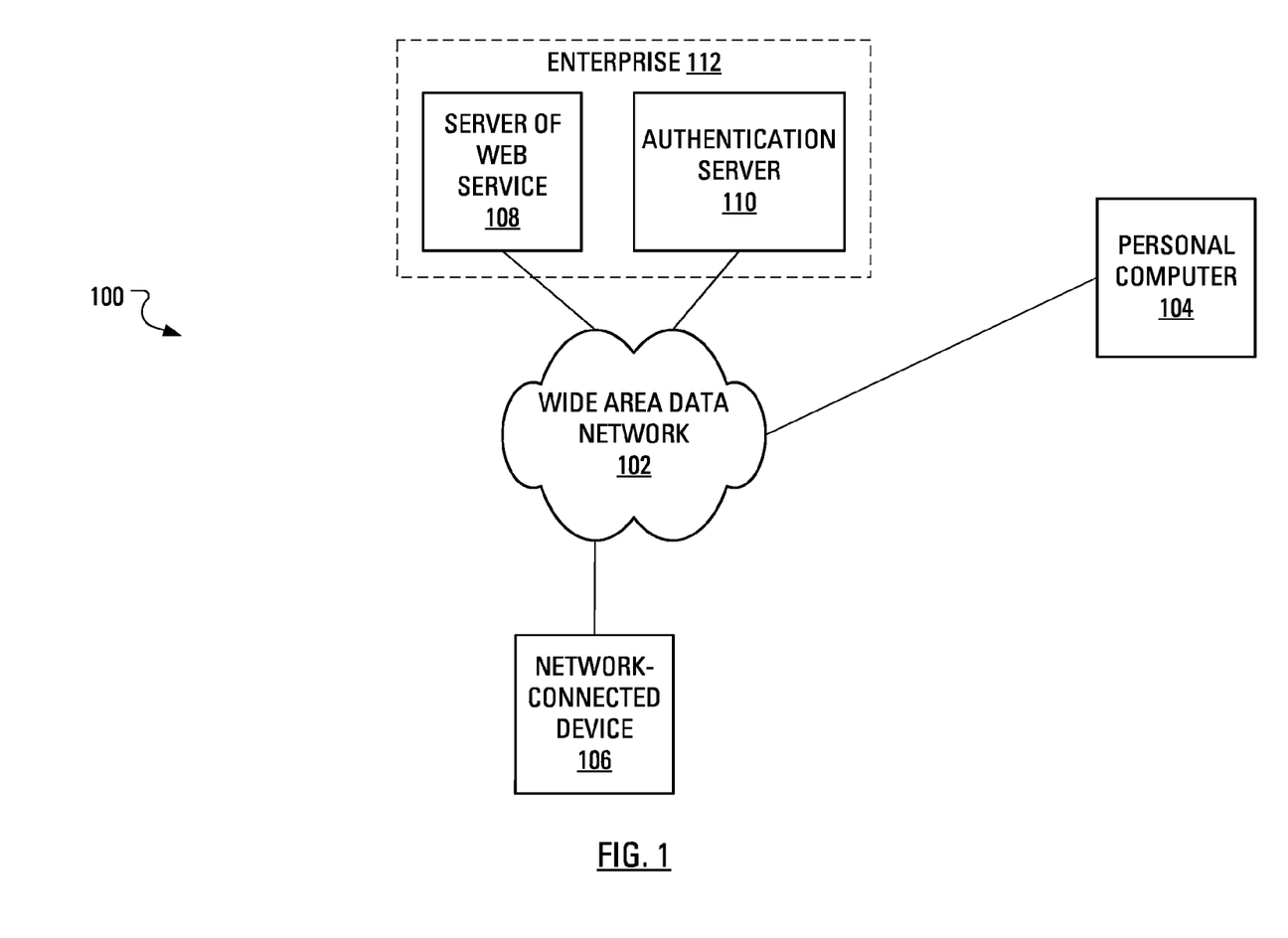
FIG. 1 illustrates an environment suitable for describing aspects of the present application, the environment including a personal computer, a server and a network-connected device.

FIG. 1 illustrates a system 100 suitable for describing aspects of the present application. The system 100 includes a wide area network 102, which may include the Internet and/or successor networks along with smaller, local area networks. The wide area network 102 connects to a personal computer (PC) 104, which may comprise a desktop computer, a laptop computer, a so-called netbook computer, a tablet computer, a mobile device, a smart phone, etc. The wide area network 102 also connects to a network-connected device 106. The network-connected device 106 may comprise any one of the devices mentioned as possibilities for the PC 104 along with myriad other possibilities. The wide area network 102 also connects to a server 108 for a web service and an authentication server 110. The server 108 for the web service and the authentication server 110 may be grouped together within an enterprise 112.

The server 108 may, for example, comprise a Mobile Service Delivery Platform (MSDP) server. The MSDP may comprise a generic platform designed to host mobile applications.

Figure 2:
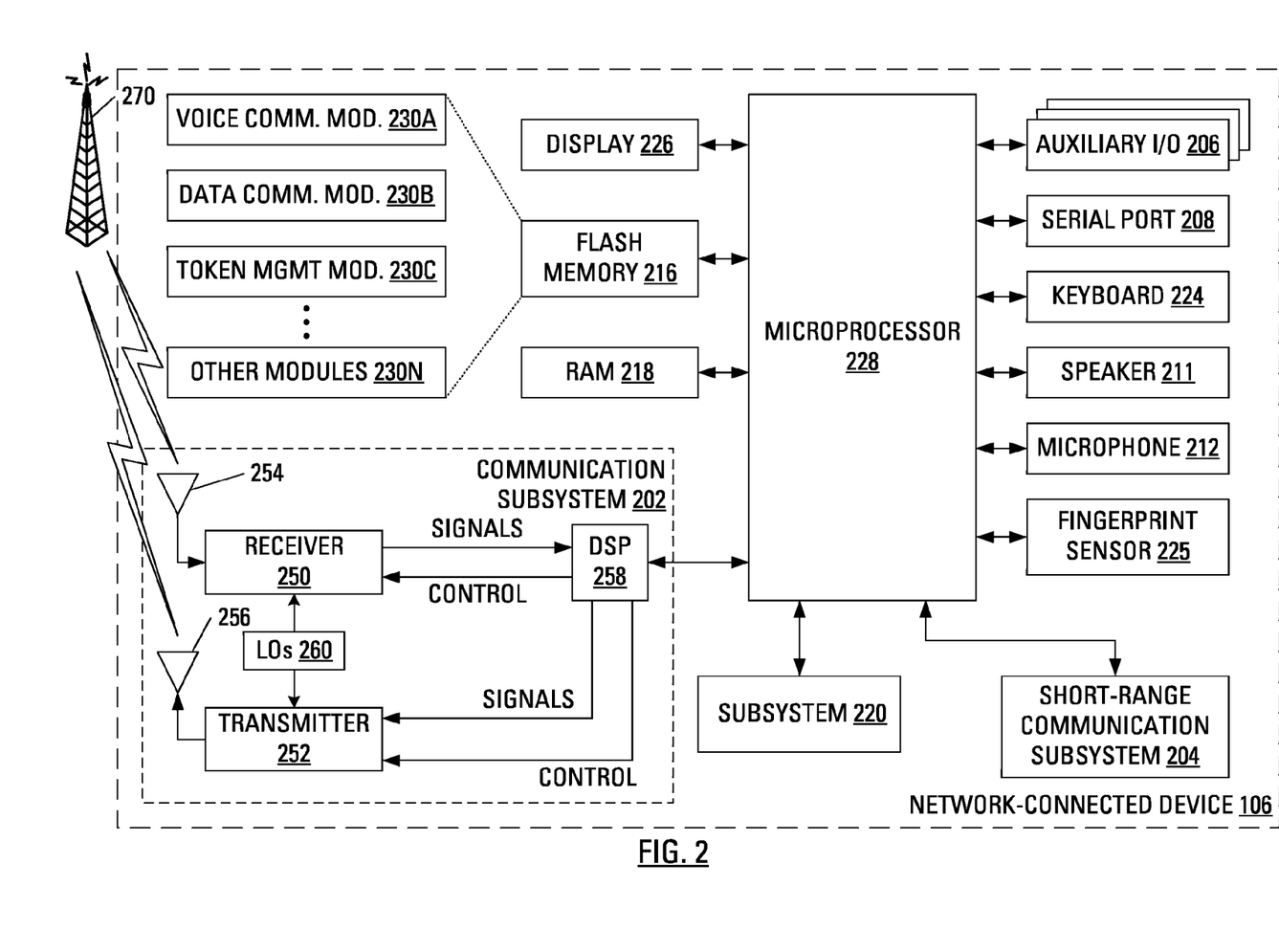
FIG. 2 illustrates components of the network-connected device of FIG. 1.

FIG. 2 illustrates example particular components of the network-connected device 106 of FIG. 1. The network-connected device 106 may, for example, include a housing, an input device (e.g., a keyboard 224 having a plurality of keys) and an output device (e.g., a display 226), which may comprise a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the network-connected device 106, in part, responsive to actuation of the keys on the keyboard 224 by a user.

The housing may be elongated vertically, or may take on other sizes and shapes (including clamshell housing structures). In the case in which the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the network-connected device 106 are shown schematically in FIG. 2. These may include a communications subsystem 202, a short-range communications subsystem 204, the keyboard 224 and the display 226. The network-connected device 106 may further include other input/output devices, such as a set of auxiliary I/O devices 206, a serial port 208, a speaker 211 and a microphone 212. The network-connected device 106 may further include memory devices including a flash memory 216 and a Random Access Memory (RAM) 218 and various other device subsystems 220. The network-connected device 106 may comprise a two-way radio frequency (RF)

communication device having voice and data communication capabilities. In addition, the network-connected device 106 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the network-connected device 106. A predetermined set of software applications that control basic device operations, such as a voice communications module 230A and a data communications module 230B, may be installed on the network-connected device 106 during manufacture. A token management module 230C may also be installed on the network-connected device 106 during manufacture, to implement aspects of the present disclosure. As well, additional software modules, illustrated as an other software module 230N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and, optionally, voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the network-connected device 106 is intended to operate. For example, the communication subsystem 202 of the network-connected device 106 may be designed to operate with the Mobitex™, DataTAC™ or General Packet Radio Service (GPRS) mobile data communication networks and may optionally be designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the network-connected device 106.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When network registration or activation procedures have been completed, the network-connected device 106 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In an optional voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the network-connected device 106. In addition, the display 226 may also be utilized in voice communication mode, for example, to display the identity of a calling party, the duration of a voice call, or other voice call related information.

The short-range communications subsystem 204 enables communication between the network-connected device 106 and other proximate systems or devices, which need not necessarily be similar devices. For example, the short-range communications subsystem may include an infrared device and associated circuits and components, or a Bluetooth™ communication module to provide for communication with similarly-enabled systems and devices, or a near field communication module, etc.

In overview, there may be a situation in which a file at the PC 104 is to be transferred to the network-connected device 106. Providing access to the network-connected device 106, for the purposes of file transfer and others, may be part of the web service offered by the MSDP server 108. Indeed, the network-connected device 106 may be associated with the enterprise 112.

The file may comprise a block of arbitrary information, or resource for storing information, which is available to a computer program and is usually based on some kind of durable storage. A file is durable in the sense that the file remains available for programs to use after the current program has finished. Files may be defined by their format. Example file formats include those for storing digital images, word processing documents, presentation documents, spreadsheets, printer-specific output, non-printer-specific output, hypertext documents, digital music, digital video, etc. text avoid provisioning pki infrastructure—executable—

Figure 3:
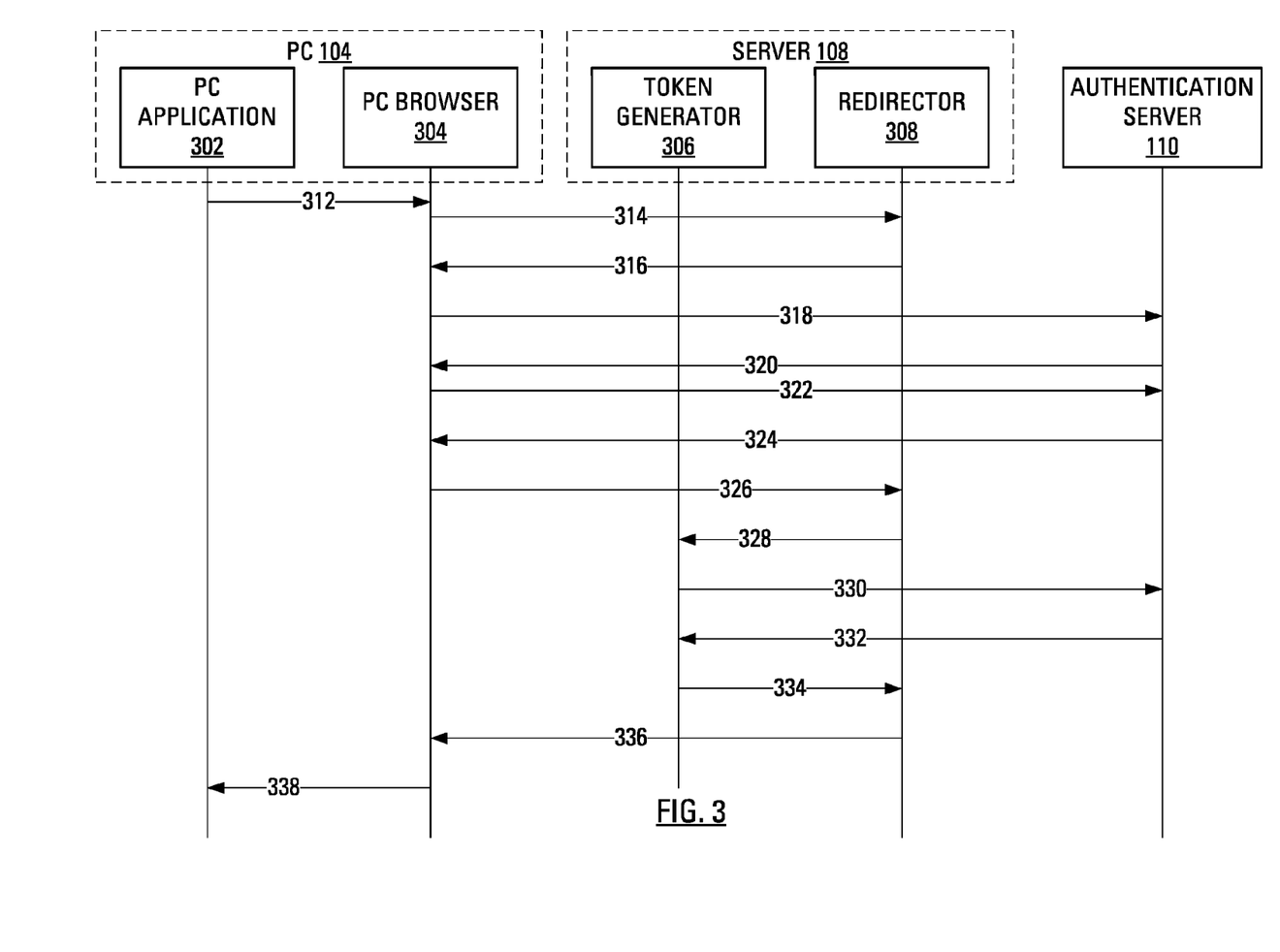
FIG. 3 illustrates interaction between the components of the environment of FIG. 1, the interaction in relation to obtaining a token.

Interaction between the components of the system 100 of FIG. 1 is illustrated in FIG. 3 in relation to obtaining a token. It may be considered that it is an application 302 executed by a processor (not shown) of the PC 104 that is to transfer a file to the network-connected device 106. The application 302 may be pre-arranged to contact the MSDP server 108 to obtain a token for use when transferring a file to the network-connected device 106.

The application 302 may signal (step 312) a browser 304, also executed by the processor of the PC 104, with an indication of a uniform resource locator (or "URL", also known as a web address) for the MSDP server 108. More particularly, the URL may relate to a redirector 308 within the MSDP server 108. Accordingly, the browser 304 may signal (step 314) a request for a token for use in a file transfer. Responsively, the redirector 308 may signal (step 316) the browser 304 with a URL for the authentication server 110. The browser 304 may then signal (step 318) the request for a token to the authentication server 110. The authentication server 110 may serve (step 320), to the browser 304, a page prompting for an authentication username and associated password. Upon receiving the username and associated password, the browser 304 may provide (step 322) the username and associated password to the authentication server 110.

Upon authenticating the username and associated password received from the browser 304, the authentication server 110 may generate an authentication server token and transmit (step 324) the authentication server token to the browser 304. There may be safeguards in place such that the authentication server token is not allowed to be maintained at the PC 104. Accordingly, the PC 104 may use the recently received authentication server token to obtain a token that is allowed to be maintained at the PC 104. To that end, the browser 304 signals (step 326) the redirector 308 with the authentication server token. The redirector 308 signals (step 328) a token generator 306 within the MSDP server 108 to generate a token specific to the file transfer web service provided by the MSDP server 108 (hereinafter a "MSDP file transfer token"). The redirector 308 includes the authentication server token when signaling (step 328) the token generator 306.

The token generator 306 signals (step 330) the authentication server 110 with the authentication server token to confirm that the authentication server token is valid. Upon receiving (step 332) an assurance that the authentication server token is valid, the token generator 306 generates a MSDP file transfer token and serves (step 334) the MSDP file transfer token to the redirector 308. The redirector 308 serves (step 336) the MSDP file transfer token to the browser 304. The browser 304 passes (step 338) the MSDP file transfer token to the application 302.

The MSDP file transfer token may contain information such as: Username; Issued Timestamp; and Expiry Time. The MSDP file transfer token may be signed and encrypted (using a set of cryptographic keys installed on the MSDP server 108). Besides the encrypted MSDP file transfer token, which is opaque to the PC application 302, the MSDP server 108 may also return the username in the clear, so that the PC application 302 can use the username in request later, or in informational display, etc.

Two main kinds of communication between the PC 104, the MSDP server 108 and the network-connected device 106 have been considered: transaction-based; and session-based.

Figure 4:
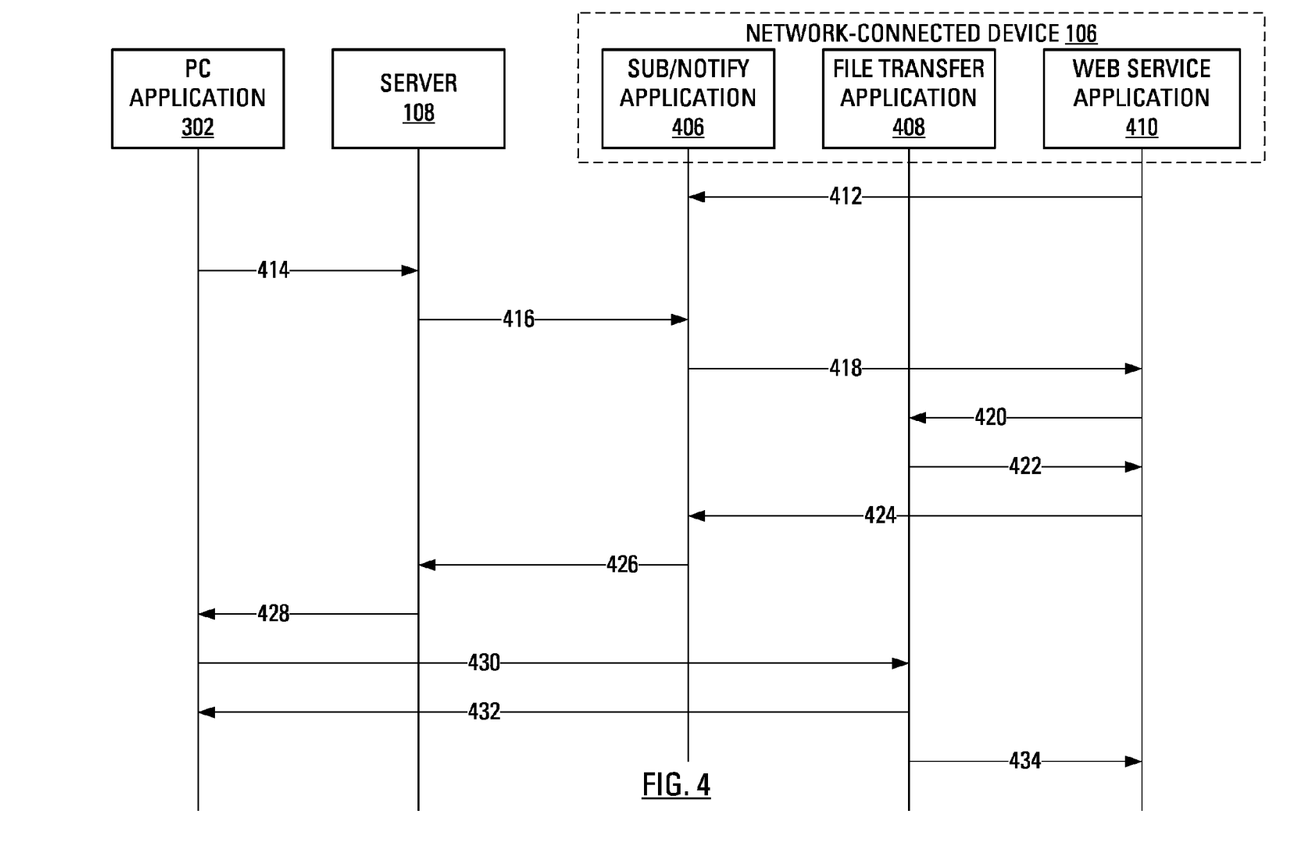
FIG. 4 illustrates a transaction-based call flow for an example file transfer.

FIG. 4 illustrates a transaction-based call flow for an example file transfer. The network-connected device 106 is illustrated as executing the following applications: a subscribe/notify application 406; a file transfer application 408; and a web service client application 410.

Initially, the web service client application 410 registers (step 412) with the subscribe/notify application 406 so that the web service client application 410 may receive notification of new requests related to the file transfer web service.

Some time later, the PC application 302 transmits (step 414) a request to the MSDP server 108. The request may, for example, include information such as the username of the user of both the PC 104 and the network-connected device 106. The request may, for example, also include information such as an indication that the request is related to a file transfer, the MSDP file transfer token and an indication that the file transfer is to use the related web service.

When the PC application 302 transmits (step 414) the request to the MSDP server 108, the PC application 302 may, for example, invoke a "RESTful" interface on the MSDP server 108. The communication between the PC application 302 and the MSDP server 108 may, for example, be accomplished over Hypertext Transfer Protocol Secure (HTTPS), to discover and communicate with the peer application to the PC application 302 running on the network-connected device 106. The peer application to the PC application 302 running on the network-connected device 106 is the file transfer application 408.

Representational state transfer (REST) is a style of software architecture for distributed hypermedia systems such as the World Wide Web. Conforming to the REST constraints is referred to as being "RESTful".

The MSDP server 108 may authenticate the received request, to verify the identity of the requestor. The MSDP server 108, may accomplish this authenticating by verifying that the received the MSDP file transfer token is the same as the MSDP file transfer token that the MSDP server has previously issued (step 336, FIG. 3) to the PC 104.

The MSDP server 108 may then identify the network-connected device 106 as a target device based on the username provided in the request (received in step 414). Upon identifying the network-connected device 106 as the target device, the MSDP server 108 may transmit (step 416) the request, with an indication of the issue timestamp for the MSDP file transfer token, to the network-connected device 106. If the network-connected device 106 is not found, or is not "in coverage" at this point, the MSDP server 108 may return an error response (not shown) back to the PC application 302 and an error message may be presented to the user of the PC 104.

The transmission (step 416) of the request to the network-connected device 106 may be accomplished using Transport Layer Security (TLS). TLS, like its predecessor, Secure Sockets Layer (SSL), is a cryptographic protocol that provides communication security over the Internet. TLS and SSL encrypt segments of network connections above the Transport Layer, using asymmetric cryptography for key exchange, symmetric encryption for privacy, and a keyed message authentication code for message reliability.

At the network-connected device 106, the request is received by the subscribe/notify application 406, for example, using a Session Initiation Protocol (SIP) signaling protocol. The subscribe/notify application 406 then notifies (step 418) the web service client application 410 that a request has been received. Recall that, in step 412, the web service client application 410 registered to receive notification of events of the type exemplified by the receipt of the file transfer request.

Responsive to receiving notification of the request, the web service client application 410 signals (step 420) the file transfer application 408 to generate a URL for the requested file transfer. The web service client application 410 generates a URL for the requested file transfer along with a temporary embedded token and transmits (step 422) the URL and temporary embedded token to the web service client application 410. Responsive to receiving the URL and temporary embedded token, the web service client application 410 transmits (step 424) the URL and temporary embedded token to the subscribe/notify application 406.

The subscribe/notify application 406 transmits (step 426) the URL and temporary embedded token to the MSDP server 108 and the MSDP server 108 transmits (step 428) the URL and temporary embedded token to the PC application 302.

The PC application 302 on the PC 104 may then transfer (step 430) the file directly to the network-connected device 106 using the URL and temporary embedded token received in step 428. More particularly, the PC application 302 may employ a HTTPS "post" request method for the transfer (step 430). The file may be received by the file transfer application 408 at the network-connected device 106. The file transfer application 408 may then signal (step 432) the PC application 302 to indicate that the file has been successfully received. The file transfer application 408 may also signal (step 434) the web service client application 410 that the file has been successfully completed.

Figure 5:
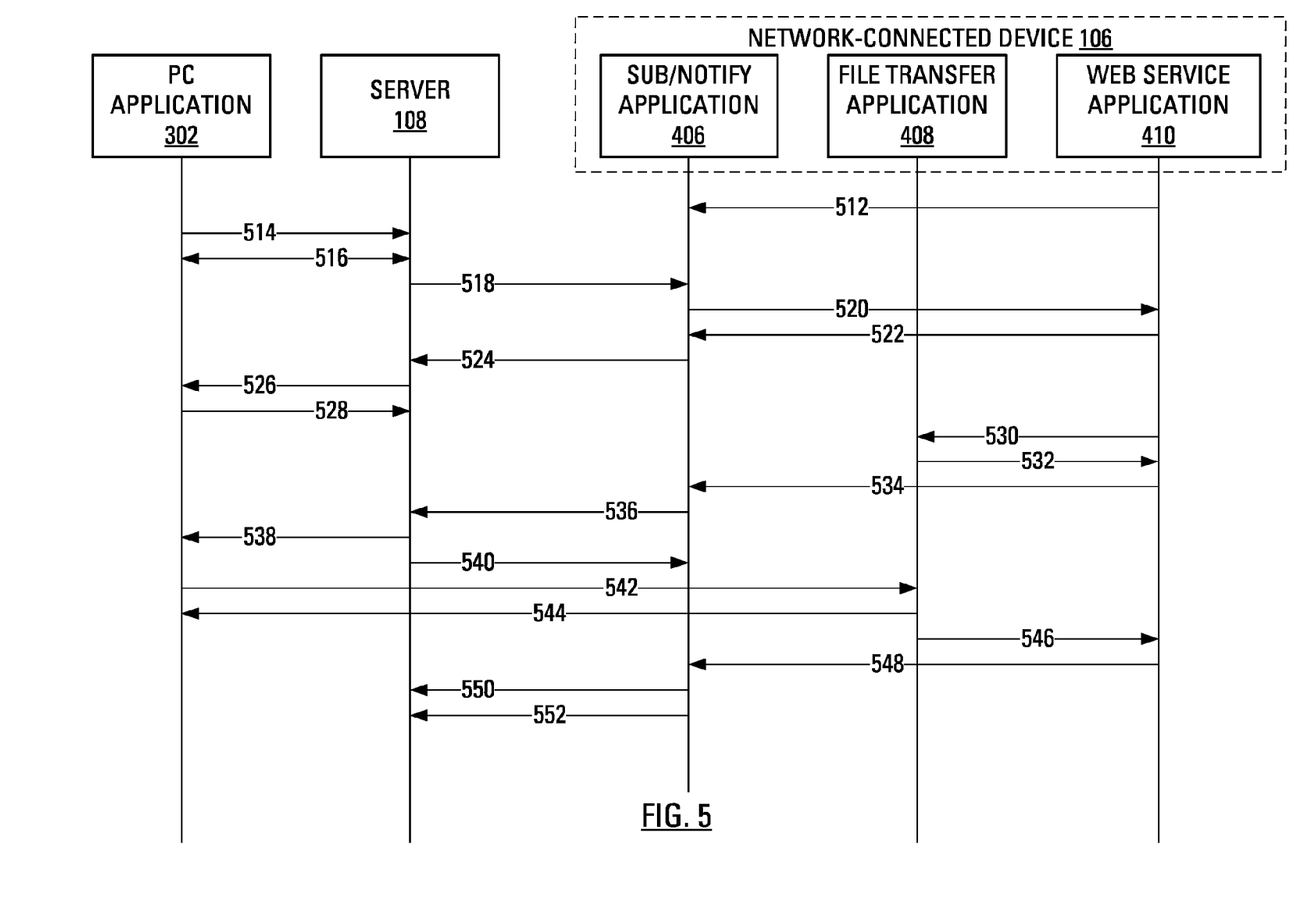
FIG. 5 illustrates a session-based call flow for an example file transfer.

FIG. 5 illustrates a session-based call flow for an example file transfer.

Initially, the web service client application 410 registers (step 512) with the subscribe/notify application 406 so that the web service client application 410 may received notification of new requests related to the file transfer web service.

Some time later, the PC application 302 transmits (step 514) a request to the MSDP server 108. The PC application 302 and the network-connected device 106 may exchange messages (step 516) to authenticate the user of the PC 104. During the exchange, the network-connected device 106 may determine a username to associate with the request.

The MSDP server 108 may then identify the network-connected device 106 as the target device based on the username received in the exchange of step 516. Upon identifying the network-connected device 106 as the target device, the MSDP server 108 may transmit (step 518) an INVITE message, with an indication of the issue timestamp for the MSDP file transfer token, to the network-connected device 106. If the network-connected device 106 is not found, or is not "in coverage" at this point, the MSDP server 108 may return an error response (not shown) back to the PC application 302 and an error message may be presented to the user of the PC 104.

At the network-connected device 106, the INVITE message is received by the subscribe/notify application 406. The subscribe/notify application 406 then notifies (step 520) the web service client application 410 of the received INVITE message with the indication of the issue timestamp for the MSDP file transfer token. In step 412, the web service client application 410 registered to receive notification of events of the type exemplified by the received INVITE message.

Responsive to receiving notification of the INVITE message, the web service client application 410 prompts the user to allow the file transfer and signals (step 522) the subscribe/notify application 406 to indicate that the user is being prompted.

The subscribe/notify application 406 passes (step 524) the indication of the prompting to the MSDP server 108. Responsive to the indication of the prompting, the MSDP server 108 creates a session and signals (step 526) an indication of a session identification, for the created session, to the PC application 302.

The PC application 302 reacts to the indication of a session identification by transmitting (step 528), to the MSDP server 108, a request using the HTTP GET method and identifying the session. The PC Application 302 then waits to receive a URL from the MSDP server 108.

Responsive to the prompt, presented to the user by the web service client application 410, the user may indicate acceptance of the file transfer. Responsive to receiving acceptance of the file transfer, the web service client application 410 signals (step 530) the file transfer application 408 to generate a URL for the requested file transfer. The web service client application 410 generates a URL for the requested file transfer and transmits (step 532) the URL to the web service client application 410. Responsive to receiving the URL, the web service client application 410 transmits (step 534) the URL to the subscribe/notify application 406 along with an indication that the file transfer has been accepted.

The subscribe/notify application 406 transmits (step 536) the URL to the MSDP server 108 and the MSDP server 108, responsive to the request received in step 528, transmits (step 538) the URL to the PC application 302. The MSDP server 108 may also transmit (step 540) and acknowledgement of receipt of the URL to the subscribe/notify application 406.

The PC application 302 on the PC 104 may then transfer (step 542) the file directly to the network-connected device 106 using the URL received in step 538. More particularly, the PC application 302 may employ a HTTPS "post" request method for the transfer (step 542). The file may be received by the file transfer application 408 at the network-connected device 106. The file transfer application 408 may then signal (step 544) the PC application 302 to indicate that the file has been successfully received. The file transfer application 408 may also signal (step 546) the web service client application 410 that the file has been successfully completed. The web service client application 410 may notify (step 548) the subscribe/notify application 406 that the file transfer has terminated.

Responsive to receiving notification (step 548) that the file transfer has terminated, the subscribe/notify application 406 may transmit (step 550) a "BYE" signal and may transmit (step 550) a "200OK" signal to the MSDP server 108. These signals act to notify the MSDP server 108 that the "session" (or the file transfer in this case) has finished (successfully or not), thereby allowing the MSDP server 108 to formally terminate the session initiated by the INVITE message (step 518) both for statistical and resource cleanup purposes.

The user may wish to revoke a MSDP file transfer token that was issued and stored on the PC 104 for file transfer purposes as described hereinbefore. Such revocation may be desired in a case wherein the user has lost the PC 104 or a case wherein the user is transferring ownership of the PC 104.

Figure 6:
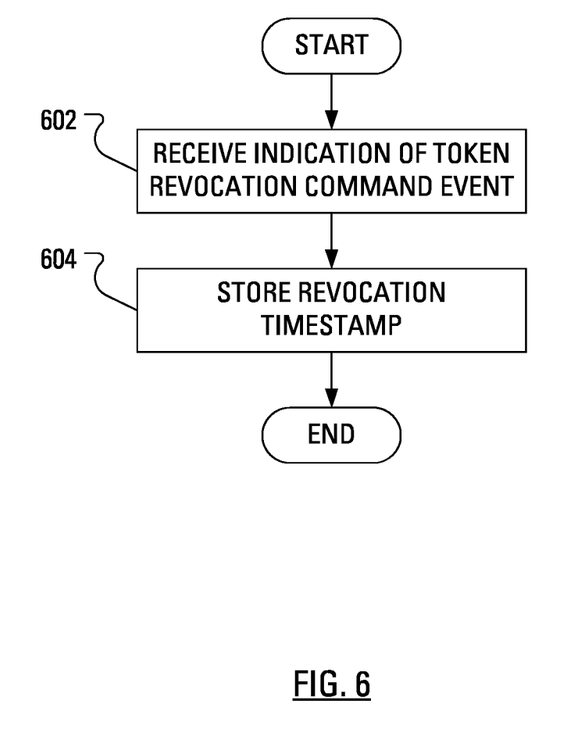
FIG. 6 illustrates example steps in a method of handling token revocation.

FIG. 6 illustrates example steps in a method of handling token revocation. The user may initiate token revocation by interacting with the web service client application 410 on the network-connected device 106 to issue a "Token Revocation" command. Responsive to receiving (step 602) an indication of the "Token Revocation" command event, the microprocessor 228 (see FIG. 2) of the network-connected device 106, under control of the web service client application 410, may store (step 604) a timestamp of this event, a "revocation timestamp".

Figure 7:
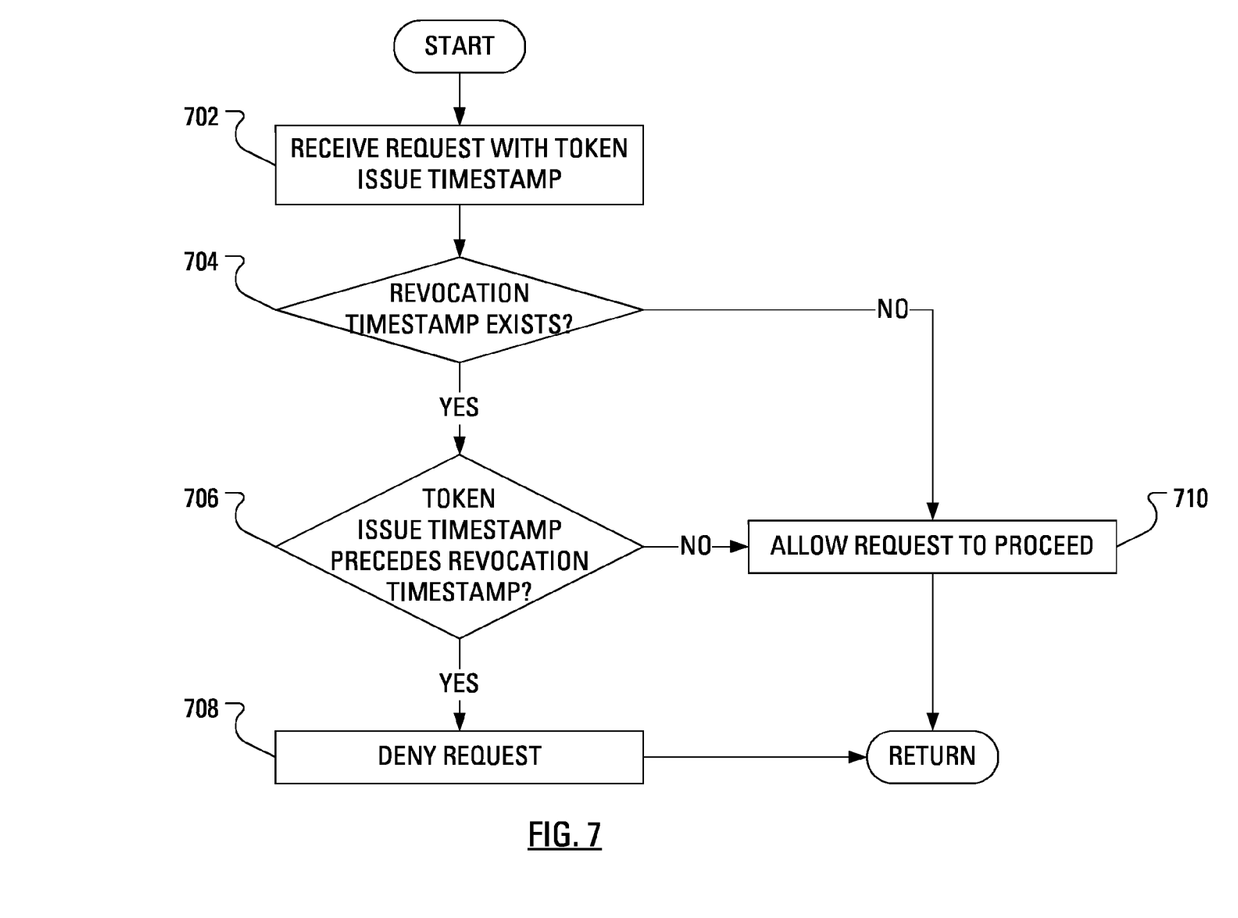
FIG. 7 illustrates example steps in a method of handling a request in view of possible token revocation in accordance with aspects of the present application.

FIG. 7 illustrates example steps in a method of handling a request in view of possible token revocation. Subsequent to the receipt of the Token Revocation command, the microprocessor 228 of the network-connected device 106 may receive (step 702) a request accompanied by an indication of the issue timestamp for an MSDP file transfer token (see step 416, FIG. 4). In a session-based call flow, the microprocessor 228 of the network-connected device 106 may receive (step 702) an INVITE message accompanied by an indication of the issue timestamp for an MSDP file transfer token (see step 518, FIG. 5).

Responsive to receipt of the request, which may be considered to encompass the INVITE message, the microprocessor 228 may determine (step 704) whether a revocation timestamp exists. Responsive to determining (step 704) that a revocation timestamp exists, the microprocessor 228 may compare the issue timestamp to the revocation timestamp to determine (step 706) whether the issue timestamp temporally precedes the revocation timestamp. Upon determining (step 706) that the issue timestamp temporally precedes the revocation timestamp, the microprocessor 228 may deny the request.

In particular, to deny the request, the microprocessor 228 may transmit, to the MSDP server 108, an indication that the issue timestamp temporally precedes the revocation timestamp. Responsive to receiving such an indication, the MSDP server 108 may forward the indication to the PC application 302. The PC application 302 may be arranged to respond to receipt of such an indication by deleting the stored MSDP file transfer token.

Responsive to determining (step 704) that a revocation timestamp does not exist, the microprocessor 228 may simply allow the request to proceed as outlined hereinbefore. Similarly, responsive to determining (step 706) that the issue timestamp temporally follows the revocation timestamp, the microprocessor 228 may simply allow the request to proceed as outlined hereinbefore.

In an example embodiment of aspects of the present application, the network-connected device 106 may comprise a tablet computer to which the user of the PC 104 wishes to send a representation of a file, thereby allowing review of the file while the user is away from the PC 104. The PC application 302 may be installed on the PC 104 in a manner that establishes a new printing option within the operating system for the PC 104. In the present example, the printing option may be called a "print-to-tablet" option.

With a first file open and the "print-to-tablet" option selected, responsive to receiving a print command, the processor (not shown) of the PC 104 may execute the PC application 302 to convert the first file to a second file, wherein the second file is, for example, in the Adobe® portable document format (PDF), or some other format readily displayed on the network-connected device 106. The processor of the PC 104 may then execute the PC application 302 to arrange transfer of the second file to the network-connected device 106 as described hereinbefore. Upon completion of the file transfer, the second file is stored and viewable on the network-connected device 106. The virtual printing of the second file to the network-connected device 106 saves paper, costs, and time by avoiding printing the second file onto paper.

It may be considered that printing a document to the network-connected device 106 is better than sending an email message with a file attachment. First of all, there is a labor savings in that printing to the network-connected device 106 is apparently a one-step process, whereas sending an email message with a file attachment potentially involves saving the document to a different file format, initiating email message sending, addressing the email message, selecting the attachment and sending the email message.

It may also be considered that printing a document to the network-connected device 106 is better than storing a file at a universally available, operator-specific, network-connected storage device, e.g., a so-called cloud server. For example, printing a document to the network-connected device 106 may be considered to establish greater privacy than the privacy available when storing a file at a cloud server. Additionally, the operator of a cloud server may, occasionally, take the cloud server off-line for maintenance or may, in an extreme case, cease operations.

Beyond the "print-to-tablet" option described hereinbefore, aspects of the present application may be applied to requests to arrange receipt, at a target device, of more than just documents. Indeed, alternative requests may relate to arranging receipt, at the target device, of a video stream, an audio stream or a text stream. Further alternative requests for interaction with the target device may relate to two-way traffic, such as video conferencing or instant messaging. Even further alternative requests for interaction with the target device may relate to requests to receive media from the target device. The media may include audio, video and/or text.

The applications of aspects of the present disclosure have, to this point, been discussed in the context of peer-to-peer interaction between devices. However, further aspects of the present disclosure may be applied to devices having a client-server relationship.

The token-based management of interaction between devices disclosed in the present application is distinct from a digital certificate-based scheme in a traditional private key infrastructure. Conveniently, the present application does not involve maintenance of certificate revocation lists in the manner of traditional private key infrastructure. Accordingly, the burden, on the infrastructure, to distribute, store and maintain up-to-date such lists is obviated by aspects of the present application.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of handling a communication request representative of an invitation to allow, at a target device, interaction between an origin device and the target device, the method referencing a generated token that has been generated by a server device in response to a token request from the origin device, the generated token having been transmitted from the server device to the origin device, the method including:
  receiving, at a processor, an indication of a token revocation command event, the token revocation command event resulting from interaction with an application executed on the target device;
  responsive to the receiving the indication, storing, in a memory, a revocation timestamp, the revocation timestamp being indicative of a time of occurrence for the token revocation command event;
  receiving, at a communication subsystem and from the server device, the communication request accompanied by an indication of a token issue timestamp for the generated token, wherein the communication request originates from the origin device and is transmitted to the server device with a received token, which has been verified, at the server device, as being the same as the generated token; and
  in response to determining, at the processor, that the token issue timestamp temporally precedes the revocation timestamp, denying the communication request.

2. The method of claim 1 wherein the denying the communication request comprises transmitting, to the server device, an indication that the token issue timestamp precedes the revocation timestamp.

3. The method of claim 1 wherein the communication request relates to a transfer of a file to the target device.

4. The method of claim 1 wherein the communication request relates to streaming video to the target device.

5. The method of claim 1 wherein the communication request relates to streaming audio to the target device.

6. The method of claim 1 wherein the communication request relates to streaming text to the target device.

7. The method of claim 1 wherein the communication request relates to video conferencing.

8. The method of claim 1 wherein the communication request relates to instant messaging.

9. The method of claim 1 wherein the communication request relates to receiving media from the target device.

10. The method of claim 9 wherein the media comprises audio.

11. The method of claim 9 wherein the media comprises video.

12. The method of claim 9 wherein the media comprises text.

13. A target device comprising:
  a processor adapted to:
    execute an application;
    receive an indication of a token revocation command event, the token revocation command event resulting from interaction with the application;
    store a revocation timestamp, the revocation timestamp being indicative of a time of occurrence for the token revocation command event;
    receive a communication request from a server device, the communication request representative of an invitation to allow, at the target device, interaction between an origin device and the target device, the communication request referencing a generated token that has been generated by a server device in response to a token request from the origin device, the generated token having been transmitted from the server device to the origin device, the communication request accompanied by an indication of a token issue timestamp for the generated token, wherein the communication request originates from the origin device and is transmitted to the server device with a received token, which has been verified, at the server device, as being the same as the generated token; and
    in response to determining that the token issue timestamp temporally precedes the revocation timestamp, deny the communication request.

14. A non-transitory computer readable device containing computer-executable instructions that, when performed by a processor, cause the processor to:
  execute an application;
  receive an indication of a token revocation command event, the token revocation command event resulting from interaction with the application;
  store a revocation timestamp, the revocation timestamp being indicative of a time of occurrence for the token revocation command event;
  receive a communication request from a server device, the communication request representative of an invitation to allow, at the target device, interaction between an origin device; and the target device, the communication request referencing a generated token that has been generated by a server device in response to a token request from the origin device, the generated token having been transmitted from the server device to the origin device, the communication request accompanied by an indication of a token issue timestamp for the generated token, wherein the communication request originates from the origin device and is transmitted to the server device with a received token, which has been verified, at the server device, as being the same as the generated token; and
  in response to determining that the token issue timestamp temporally precedes the revocation timestamp, deny the communication request.

15. A method of handling a communication request representative of an invitation to allow, at a target device, interaction between an origin device and the target device, the method referencing a generated token that has been generated by a server device in response to a token request from the origin device, the generated token having been transmitted from the server device to the origin device, the method including:
  receiving, at a processor, an indication of a token revocation command event, the token revocation command event resulting from interaction with an application executed on the target device;
  responsive to the receiving the indication, storing, in a memory, a revocation timestamp, the revocation timestamp being indicative of a time of occurrence for the token revocation command event;
  receiving, at a communication subsystem and from the server device, the communication request accompanied by an indication of a token issue timestamp for the generated token, wherein the communication request originates from the origin device and is transmitted to the server device with a received token, which has been verified, at the server device, as being the same as the generated token; and
  in response to determining, at the processor, that the revocation timestamp temporally precedes the token issue timestamp, allowing the communication request.

16. A method of handling a communication request representative of an invitation to allow, at a target device, interaction between an origin device and the target device, the method referencing a generated second token that has been generated by a server device in response to a token request from the origin device, the generated second token having been transmitted from the server device to the origin device, the method including:
- receiving, at a processor, an indication of a token revocation command event for a first token, the token revocation command event resulting from interaction with an application executed on the target device;
- responsive to the receiving the indication, storing, in a memory, a revocation timestamp for the first token, the revocation timestamp being indicative of a time of occurrence for the token revocation command event;
- receiving, at a communication subsystem and from the server device, the communication request accompanied by an indication of a token issue timestamp for the generated second token, wherein the communication request originates from the origin device and is transmitted to the server device with a received second token, which has been verified, at the server device, as being the same as the generated second token; and
- in response to determining, at the processor, that a revocation timestamp for the generated second token has not been stored by the target device, allowing the communication request.

* * * * *